Apr. 3, 1923.

W. J. BELL 1,450,166

SIFTING TESTING MACHINE

Filed July 5, 1919

3 sheets-sheet 1

INVENTOR
Willard J. Bell
By Fay, Oberlin & Fay
ATTORNEYS.

Apr. 3, 1923.

W. J. BELL 1,450,166

SIFTING TESTING MACHINE

Filed July 5, 1919

3 sheets-sheet 2

INVENTOR
Willard J. Bell
BY Day, Oberlin Day.
ATTORNEYS

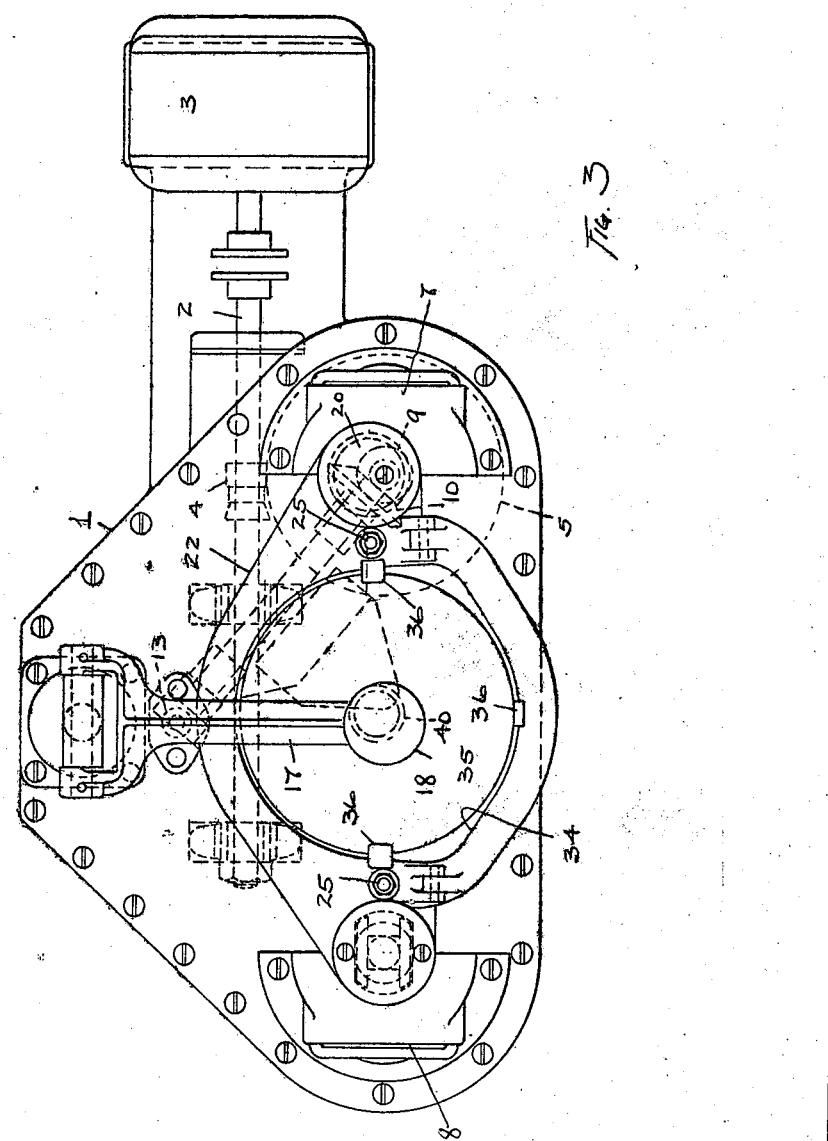

Patented Apr. 3, 1923.

1,450,166

UNITED STATES PATENT OFFICE.

WILLARD J. BELL, OF NEWAYGO, MICHIGAN.

SIFTING TESTING MACHINE.

Application filed July 5, 1919. Serial No. 308,811.

*To all whom it may concern:*

Be it known that I, WILLARD J. BELL, a citizen of the United States, and a resident of Newaygo, county of Newaygo, and State of Michigan, have invented a new and useful Improvement in Sifting Testing Machines, of which the following is a specification, the principle of the invention being herein explained and the best mode in which I have contemplated applying that principle, so as to distinguish it from other inventions.

The present invention, relating, as indicated to sifting testing machines is particularly directed to certain improvements in the sifting testing machines which are described in my prior patents, Nos. 1,120,012 and 1,174,657. The present invention has for its object improvements in the machine referred to, to render the same more convenient and effective in use, as well as to simplify the same and lower the cost of manufacture. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
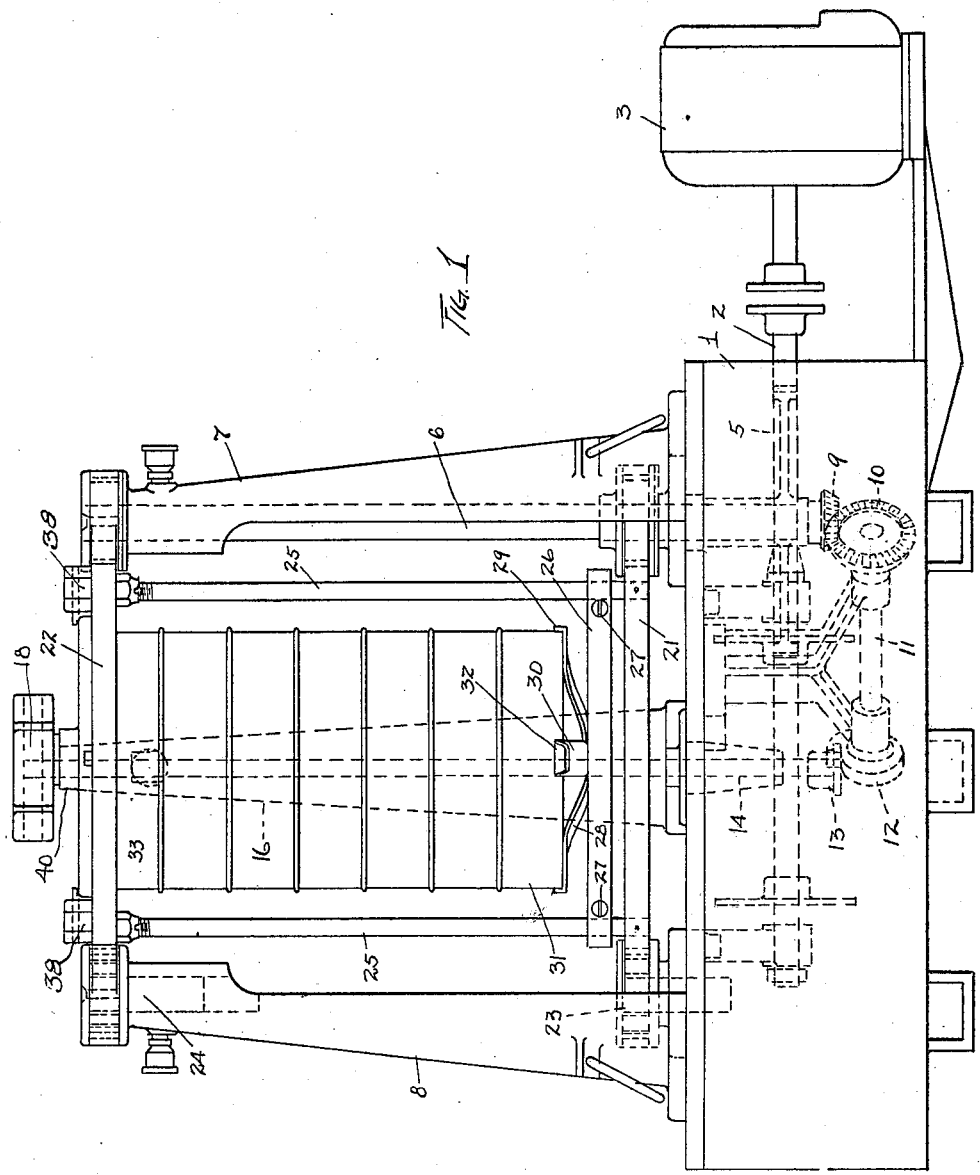
Figure 2:
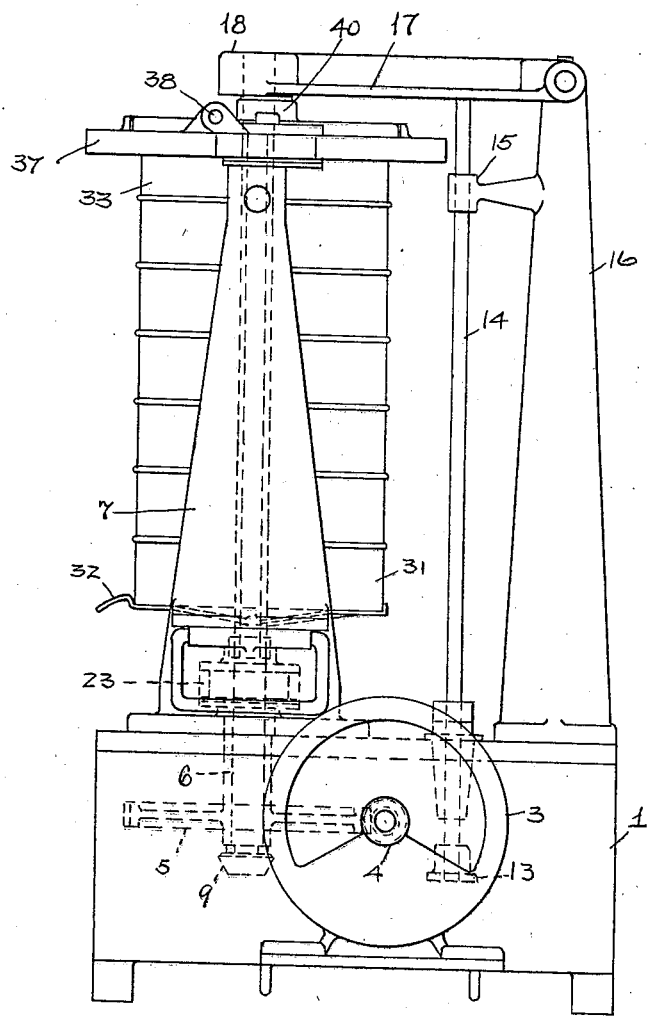

Fig. 1 is a front elevation of my machine; Fig. 2 is a side elevation of the same; and Fig. 3 is a plan view of the machine.

As is shown in Figs. 1 and 2 particularly, the machine consists of a base 1 in the form of a box-like casing adapted to be filled with lubricant and intended to house and enclose the necessary driving parts, all of which are operated from a horizontal shaft 2 which may be connected to a motor 3 and driven thereby. The shaft 2, which is carried in the casing, carries a worm 4 thereon in mesh with the gear 5, mounted on a vertical shaft 6. This driving shaft 6 extends upwardly through the top of the casing 1, where it is supported and journaled in a column-like support 7. On the opposite side of the machine is a second similar column 8, but lacking any supports or journals for a shaft, as no shaft is carried in the second support. On the lower end of the shaft 6, below the driven worm gear 5 is a bevel gear 9, which meshes with a second bevel gear 10, on a horizontal, diagonally mounted shaft 11. On the other end of the shaft 11 is a plate cam 12 operating against a follower 13 on the lower end of a slidable rod 14, which extends upwardly through the top of the casing 1 and at the rear of the machine. This rod 14 is carried in a slide bearing 15 at its upper end, the bearing being formed as a portion of a column 16, which extends slightly above the columns 7 and 8 and carries a pivoted member 17 at its upper end, which is provided with a flat hammer-like portion 18 at its free end.

Mounted on the vertical shaft 6 are eccentrics 20 adjacent to the upper and lower ends of the shaft above the casing 1, and encircling these eccentrics are extending portions of two spaced plates 21 and 22. These plates or frames are carried by the eccentrics already referred to, and are gyrated by the rotation of the eccentrics, moving the two plates 21 and 22 in a horizontal plane and in an oval path. At their other sides these two plates 21 and 22 are oscillatorily and slidably mounted upon vertical supports 23 and 24, respectively, which are mounted in the column 8, and in the top of the casing 1 adjacent thereto. By thus mounting the two plates 21 and 22 the action of the eccentrics imparts a gyratory motion to the plates, the right side of the plates travelling over an egg-shaped path under the action of the eccentrics, while the other side of the plates moves in and out in the plane of the paper across the guides 23 and 24, and of course at the same time it is moved slightly to either side of the vertical plane passing through the two supports 7 and 8. In this way substantially the same motion is given to the two plates, as was the case in my previous machine already referred to, but the motion is secured by the use of a single shaft only.

Removably carried in the plates 21 and 22 are two vertical rods 25, and on these rods is a slidable frame or plate 26 which may be adjusted to any vertical position along the rods by means of clamping set screws 27. Carried on the plate 26 are a series of spring arms 28, 29 and 30 adapted to engage over one of a series of testing sieves 31. These testing sieves are constructed to nest one within the other, as shown in Fig. 1, and the lowest sieve is supported on, and held by, the spring arms 28, 29 and 30. Of these arms, the front arm 30 is provided with a handle 32 to permit of it being sprung downward away from the sieve to allow for convenient removal of the series of sieves. At the top the uppermost sieve 33 is received within an opening 34 formed in the upper plate 22, where it is pressed against a cover plate 35, which is held in position within the opening 34 by means of inwardly extending lugs 36 on the plate 22. The front portion 37 of the plate 22 is hinged about an axis 38, permitting it to be swung upwardly out of the way of the uppermost sieve so that the latter may be conveniently removed from the machine, or the entire series of sieves may simultaneously be removed by lifting the portion 37 of the upper plate and at the same time spring down the handled arm 30. The hammer 18 is adapted to strike against a raised boss 40 at the center of the plate 35, and to thus impart a vibratory blow to the entire series of nested sieves.

The use of the present machine is substantially like that of my previous machine already referred to, except that it allows of a much more convenient insertion or removal of the sieves, and any desired number of sieves may be used at one time, either a single sieve or the entire series as may be desired. If only one sieve is to be vibrated, all of the others may be removed, and the plate 26 may then be adjusted upwardly until the spring arms 28, 29 and 30 are in position to press the single sieve against the upper plate 35. The action of the shaking mechanism and of the vibratory mechanism have been found fully as effective as those of my preceding machine, and the same gyratory action is imparted to the sieve with the present single shaft as was the case where two shafts were used, both operating through the eccentrics as before.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a sifting testing machine, the combination of spaced shaking plates adapted to receive testing sieves therebetween, a series of connected resilient sieve-engaging arms interposed between said sieves and one of said plates, and a handle on one of said arms adapted to permit such arm to be swung away from said sieves to allow of removal thereof.

2. In a sifting testing machine, the combination of spaced shaking plates adapted to receive testing sieves therebetween, said plates being adjustable toward and away from each other to accommodate varying numbers of sieves therebetween, a series of connected resilient sieve-engaging arms interposed between said sieves and one of said plates, the other of said plates having one portion hinged to swing clear of said sieves, and a handle on one of said arms adapted to permit said arm to be sprung away from said sieves to allow of removal thereof.

Signed by me, this 19" day of June, 1919.

WILLARD J. BELL.